US012601894B2

(12) United States Patent　　　　(10) Patent No.:　US 12,601,894 B2
Tillkorn et al.　　　　　　　　　　　(45) Date of Patent:　　　Apr. 14, 2026

(54) OPTICAL ARRANGEMENT WITH AN F-THETA LENS

(71) Applicant: TRUMPF Laser GmbH, Schramberg (DE)

(72) Inventors: Christoph Tillkorn, Villingendorf (DE); Reiner Bruestle, Lauterbach (DE); Tobias Marte, Lauterbach (DE); Stefan Dorer, Villingen (DE); Dominik Keller, Constance (DE)

(73) Assignee: TRUMPF LASER SE, Schramberg (DE)

( * ) Notice: Subject to any disclaimer, the term of this patent is extended or adjusted under 35 U.S.C. 154(b) by 734 days.

(21) Appl. No.: 17/886,504

(22) Filed: Aug. 12, 2022

(65) Prior Publication Data

US 2022/0390713 A1　　Dec. 8, 2022

Related U.S. Application Data

(63) Continuation of application No. PCT/EP2021/054439, filed on Feb. 23, 2021.

(30) Foreign Application Priority Data

Feb. 28, 2020　(DE) ..................... 10 2020 202 549.5

(51) Int. Cl.
　*G02B 13/00*　　　(2006.01)
　*G02B 26/08*　　　(2006.01)
　*G02B 26/10*　　　(2006.01)

(52) U.S. Cl.
　CPC ..... *G02B 13/0005* (2013.01); *G02B 26/0816* (2013.01); *G02B 26/101* (2013.01)

(58) Field of Classification Search
　CPC ............ G02B 13/0005; G02B 26/0816; G02B 26/101; G02B 26/105
　See application file for complete search history.

(56) References Cited

U.S. PATENT DOCUMENTS 4,906,061　A　†　3/1990　Yamaguchi
5,111,325　A　　　5/1992　DeJager
5,367,399　A　†　11/1994　Kramer
(Continued)

FOREIGN PATENT DOCUMENTS

CN　　101414047　A　　4/2009
CN　　107000122　A　　8/2017
(Continued)

OTHER PUBLICATIONS

German Patent Publication No. DE10-2016-211811 and English language machine translation. Both documents downloaded from WIPO at patentscope.wipo.int/search.jsf on May 2, 2025 (Year: 2016).*

(Continued)

*Primary Examiner* — Angela M. Medich
(74) *Attorney, Agent, or Firm* — LEYDIG, VOIT & MAYER, LTD.

(57) ABSTRACT

An optical arrangement for a laser beam includes an f-theta lens. The f-theta lens is disposed in a divergent beam path of the optical arrangement in order to focus the laser beam into a focus plane. The focus plane is located at a distance from a focal plane of the f-theta lens.

19 Claims, 4 Drawing Sheets

(56)  References Cited

U.S. PATENT DOCUMENTS

| | | | |
|---|---|---|---|
| 6,195,189 | B1 | 2/2001 | Nishihata et al. |
| 8,331,043 | B2 | 12/2012 | Li |
| 2007/0058233 | A1 | 3/2007 | Kim et al. |
| 2008/0259427 | A1 | 10/2008 | Voss et al. |
| 2011/0038062 | A1 | 2/2011 | Li |
| 2011/0096405 | A1 † | 4/2011 | Li |
| 2015/0077847 | A1 | 3/2015 | Erbatov |
| 2016/0209625 | A1 | 7/2016 | Li et al. |
| 2017/0304939 | A1 | 10/2017 | Rataj |

FOREIGN PATENT DOCUMENTS

| | | | | |
|---|---|---|---|---|
| CN | 206833057 | U | | 1/2018 |
| CN | 209560184 | U | | 10/2019 |
| DE | 202012003084 | U1 | | 5/2012 |
| DE | 102016211811 | A1 | | 1/2018 |
| DE | 112013007354 | B4 | | 2/2018 |
| DE | 202018100368 | U1 | | 2/2018 |
| EP | 0658790 | A2 | | 6/1995 |
| EP | 0806691 | A2 | | 11/1997 |
| EP | 1934644 | B1 | | 7/2011 |
| GB | 2188165 | A | † | 9/1987 |
| JP | H0312628 | A | † | 11/2021 |
| JP | H04174413 | A | † | 6/2022 |

OTHER PUBLICATIONS

English translation of Korean Patent Application publication No. KR20140088839. Downloaded from https://worldwide.espacenet. com/patent/ on Dec. 4, 2025. Translation provided by Google Translate tool on site. (Year: 2014).*

* cited by examiner
† cited by third party

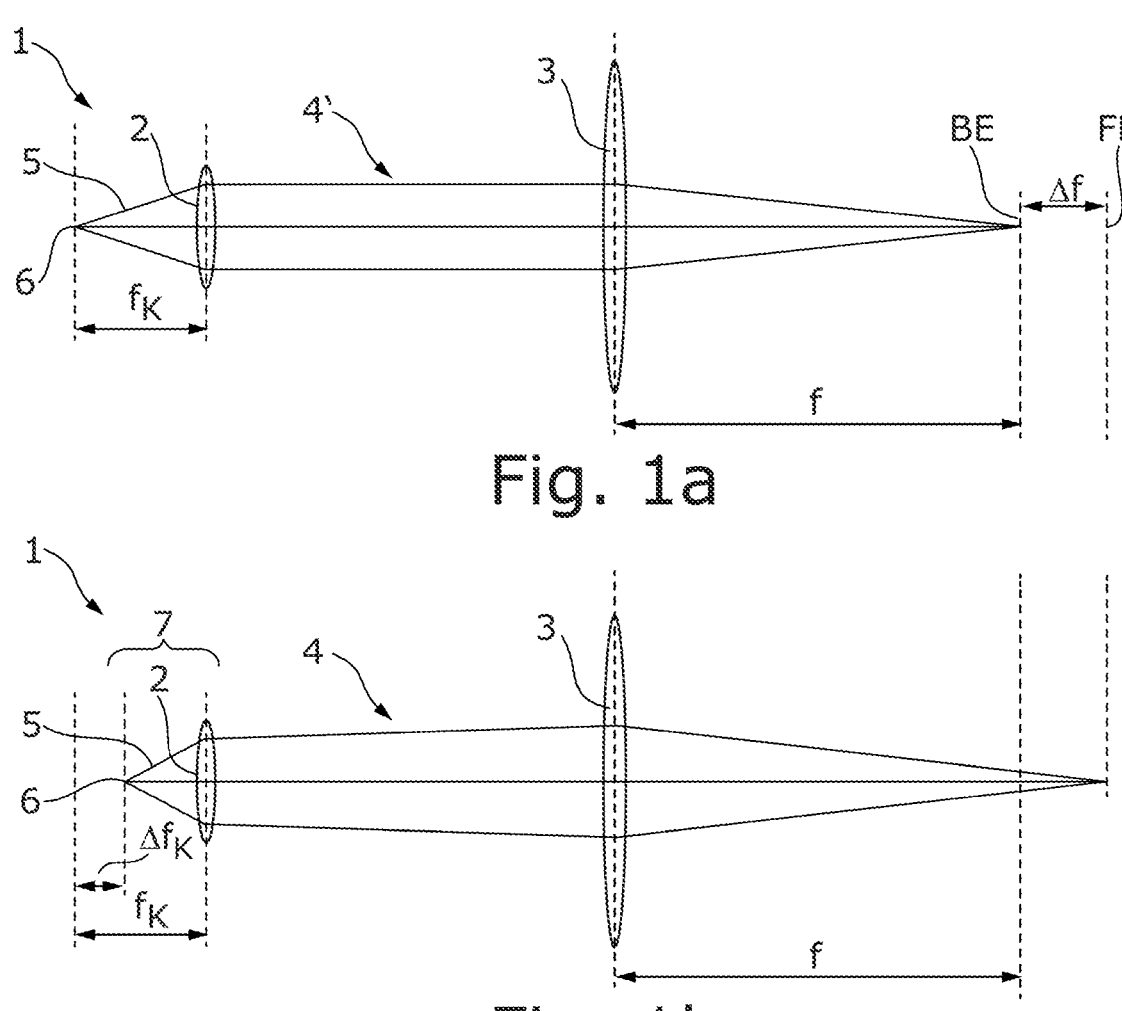
Fig. 1a
Fig. 1b
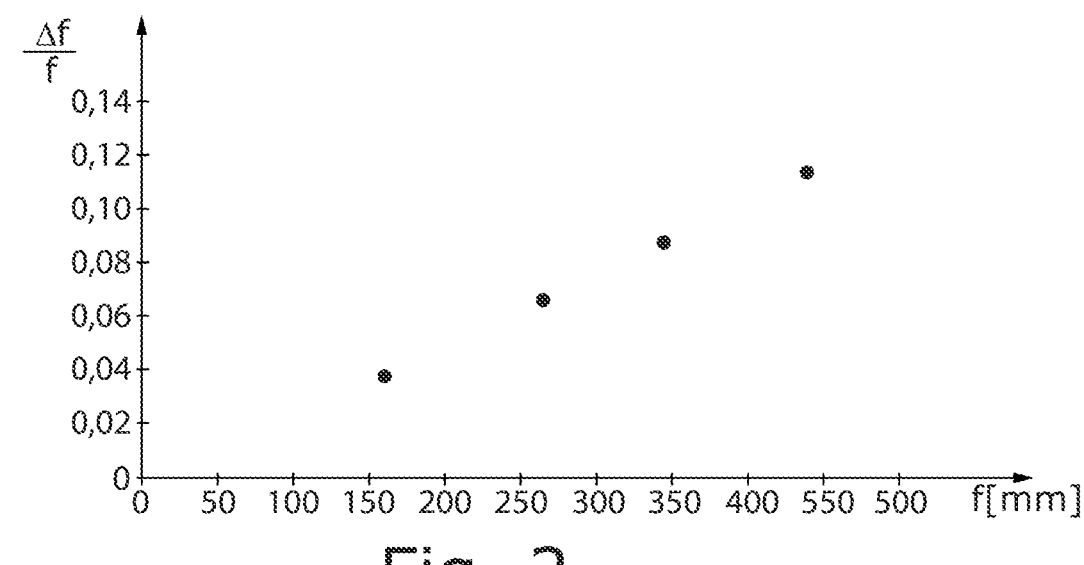
Fig. 2

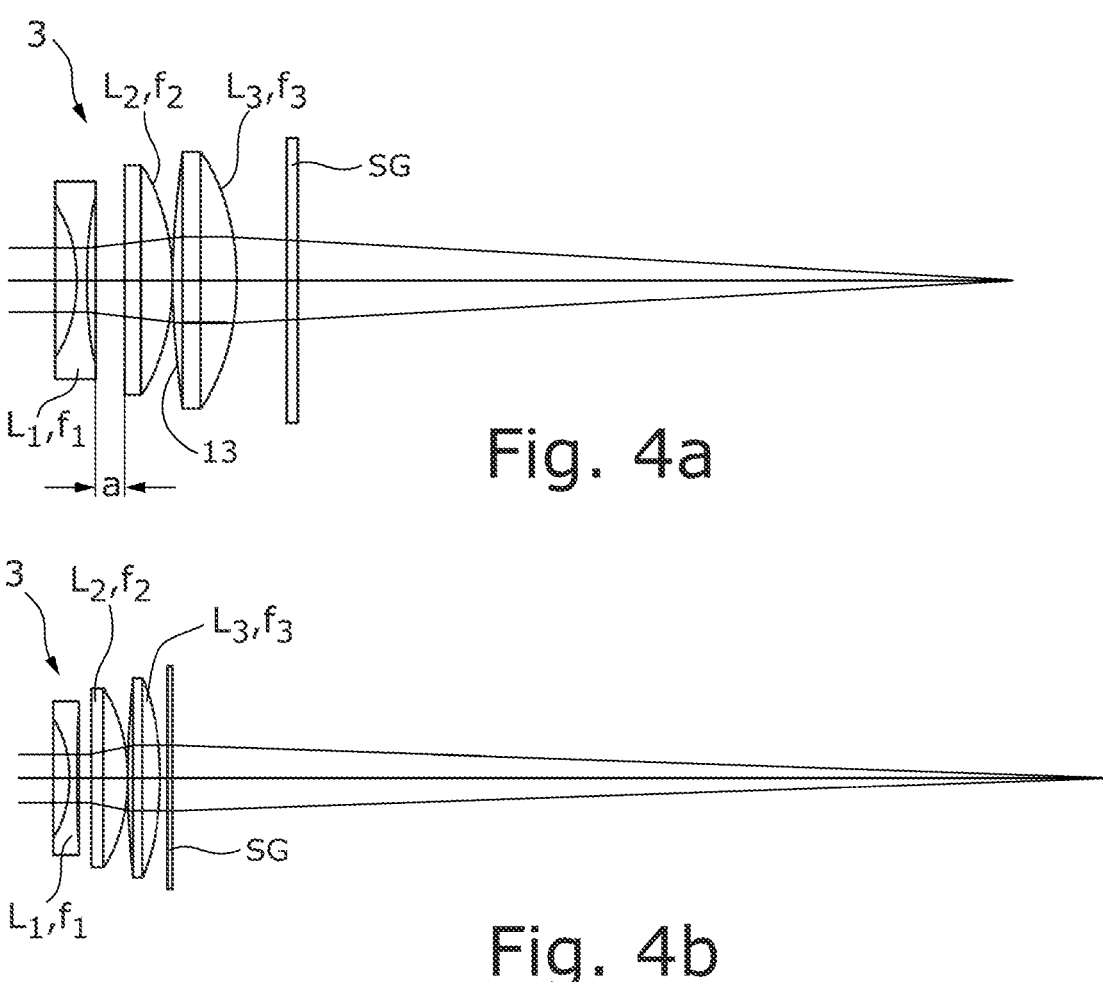
Fig. 4a
Fig. 4b
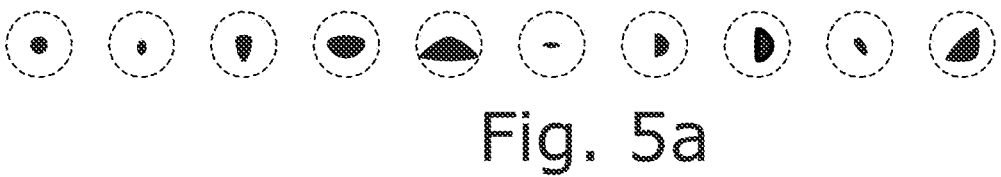
Fig. 5a
Fig. 5b

OPTICAL ARRANGEMENT WITH AN F-THETA LENS

CROSS REFERENCE TO RELATED APPLICATIONS

This application is a continuation of International Application No. PCT/EP2021/054439 (WO 2021/170579 A1), filed on Feb. 23, 2021, and claims benefit to German Patent Application No. DE 10 2020 202 549.5, filed on Feb. 28, 2020. The aforementioned applications are hereby incorporated by reference herein.

FIELD

The present invention relates to an optical arrangement, in particular to a scanner apparatus, for a laser beam.

BACKGROUND

F-theta lenses, as they are known, are frequently used in optical arrangements in the form of scanner apparatuses. An f-theta lens focuses an incident laser beam into a focus plane. Within a specified scan angle region, the ratio of the scan angle, which is typically referred to with the Greek letter theta ($\theta$), to the distance of the laser beam from the optical axis is a linear function. A laser beam which is scanned at a constant angular velocity therefore generates, in the focus plane, a focus point that moves at a constant speed, which is advantageous for material processing. The laser beam used for material processing is typically a high-power laser beam having a beam power output in the multi-kW range.

The f-theta lenses for high powers (welding applications) which are currently known are designed for multimode laser sources having a beam quality factor $M^2>20$. Such laser sources do not require f-theta lenses with an imaging quality that is diffraction-limited over the entire scan field, and aberrations especially in the peripheral region of the scan field are thus acceptable. However, in modern (welding) applications for electric vehicles, for example in hairpin welding, laser sources having a diffraction-limited or nearly diffraction-limited beam quality ($M^2<10$) are used and thus higher requirements regarding imaging quality and position accuracy have to be met. Conventional f-theta lenses can therefore be used only to a limited extent in such applications.

F-theta lenses having four lens elements or having three lens elements are known from DE 20 2012 003 084 U1 and from DE 20 2018 100 368 U1. Lens elements within this application are understood to mean individual lenses, i.e., single-piece lenses.

U.S. Pat. No. 8,331,043 B2 describes an objective lens, which has a lens group and a stop arranged in front of the lens group. The lens group has three lens elements. The first lens element is a biconcave lens having a negative refractive power, the second lens element is a meniscus lens having a positive refractive power, and the third lens element is a biconvex lens having a positive refractive power.

DE 11 2013 007 354 B4 discloses a telecentric f-theta lens for large-format infrared laser marking, which has three lens elements, of which the first lens element is a negative biconcave lens element, of which the second lens element is a positive meniscus lens element, and of which the third lens element is a positive meniscus lens element.

EP 1 934 644 B1 describes a scanner apparatus having an f-theta lens with exactly two lens elements arranged one after the other in the beam path, wherein at least one lens element has one or two aspheric lens element surfaces. The two lens elements consist of synthetic quartz glass. The at least one aspheric lens element surface should serve to minimize the number of lens elements with the required imaging quality.

DE 10 2016 211 811 A1 describes an f-theta lens having exactly four lens elements arranged one behind the other in the beam path. The third lens element is in the form of a biconvex lens and has at least one aspheric lens element surface. An f-theta lens of this type makes it possible to realize a short focal length.

SUMMARY

Embodiments of the present invention provide an optical arrangement for a laser beam. The optical arrangement includes an f-theta lens. The f-theta lens is disposed in a divergent beam path of the optical arrangement in order to focus the laser beam into a focus plane. The focus plane is located at a distance from a focal plane of the f-theta lens.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1a shows a schematic illustration of an optical arrangement having an f-theta lens, which is arranged in the collimated beam path and focuses a laser beam into a focal plane according to embodiments;

FIG. 1b shows a schematic illustration of an optical arrangement having an f-theta lens, which is arranged in the divergent beam path and focuses a laser beam into a focus plane arranged at a distance $\Delta f$ from the focal plane according to embodiments;

FIG. 2 shows a schematic illustration of the ratio of the distance $\Delta f$ to the total focal length f of the f-theta lens in dependence on the total focal length f, according to embodiments;

FIGS. 4a and 4b show schematic illustrations of an f-theta lens having three lens elements at two different focal lengths, according to embodiments;

FIGS. 5a and 5b show schematic illustrations of spot matrix diagrams of the focus spots generated by means of the f-theta lens of FIGS. 4a,b at different scan angles, according to embodiments;

DETAILED DESCRIPTION

Figure 3:
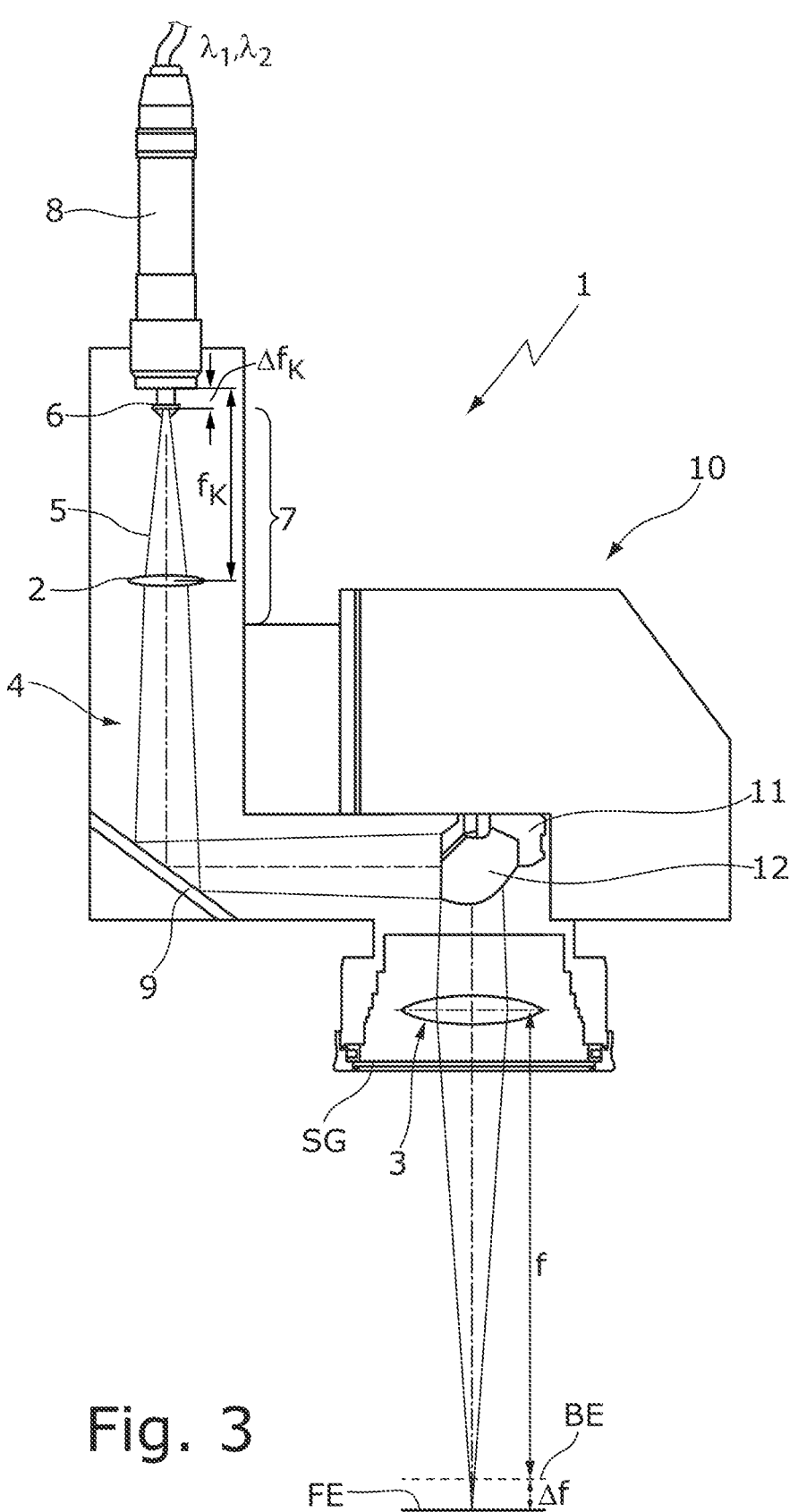
FIG. 3 shows a schematic illustration of a scanner apparatus having the f-theta lens of FIG. 1b arranged in the divergent beam path, according to embodiments.

Embodiments of the present invention provide an optical arrangement, in particular a scanner apparatus, having an f-theta lens, which has a high imaging quality with the largest possible scan field.

According to embodiments, the f-theta lens is arranged in a divergent beam path of the optical arrangement in order to focus the laser beam into a focus plane, which is situated at a distance from a focal plane of the f-theta lens.

Conventional f-theta lenses are optimized for a plane wavefront or for a collimated beam path and are therefore arranged in the collimated beam path. However, arranging an f-theta lens in the collimated beam path makes it more difficult to simultaneously optimize the imaging quality and the size of the scan field in the focus plane. With a given exit pupil, however, in addition to the imaging quality, it is especially the size of the scan field that is an important criterion for the material processing to be carried out by means of the optical arrangement.

It is therefore proposed according to the invention to arrange the f-theta lens in the divergent beam path of the laser beam. In this case, the f-theta lens is optimized for operation in the divergent beam path (finite-corrected). Owing to the arrangement in the divergent beam path, the focus plane or the image plane of the f-theta lens is displaced with respect to the (nominal) focal plane, or more specifically, the focus plane is located in the beam path downstream of the (image-side) focal plane of the f-theta lens. The focal plane of the f-theta lens is arranged at the distance of the total focal length from the f-theta lens.

In one advantageous embodiment, the focus plane is arranged at a distance $\Delta f$ from the focal plane, for which: $0.00018/\text{mm} < \Delta f/f^2 < 0.0003/\text{mm}$, wherein f denotes the total focal length of the f-theta lens. The inventors have found that an optimum imaging quality with a comparatively large scan field can be realized if the ratio between the (relative) distance $\Delta f$ to the total focal length f (i.e., $\Delta f/f$) and the total focal length f has an approximately constant value in the abovementioned value range. This applies to a large range of total focal lengths from approx. 160 mm to approx. 600 mm and possibly above. In the relatively narrow value range stated above for $\Delta f/f^2$, an optimum imaging quality can be achieved, which makes diffraction-limited imaging for fundamental mode laser applications possible and which makes, for example, twice diffraction-limited imaging for multimode laser applications possible. The maximum entrance aperture (or the diameter of the laser beam) of such an f-theta lens is generally no greater than approx. 33 mm.

In a further embodiment, the optical arrangement comprises an optical device for producing the divergent beam path, preferably comprising a beam exit surface for the divergent emergence of the laser beam and a collimation device, wherein the beam exit surface is arranged in particular at a distance from the collimation device that is shorter than a focal length of the collimation device. There are a large number of possibilities for producing the divergent beam path in which the f-theta lens is arranged. For example, the optical arrangement can have a beam exit surface, from which the laser beam emerges divergently. Such a beam exit surface can be formed for example at the front face of an optical fiber or the like. In a conventional scanner device, the beam exit surface is arranged at the distance of the focal length from the collimation device to collimate the divergent laser beam. In the present embodiment, the beam exit surface is arranged at a distance from the collimation device, for example a collimation lens, which is shorter than the focal length of the collimation device. In this way, the laser beam emerging from the beam exit surface is not completely collimated by the collimation device, but remains, after passing through the collimation device, (slightly) divergent, with the result that the f-theta lens is arranged in the divergent beam path of the laser beam despite the presence of the collimation device.

In a further embodiment, the optical arrangement comprises at least one scanner mirror for deflecting the laser beam, which is arranged in the—typically divergent—beam path upstream of the f-theta lens. The scanning mirror or mirrors is/are typically arranged in, or in the vicinity of, the entrance pupil plane of the f-theta lens. The optical arrangement in this case is a scanner apparatus. The scanner apparatus can be embodied in particular to allow the laser beam deflected by the scanning mirror(s) to be incident substantially telecentrically over the entire scanning region onto the focus plane, which typically corresponds to a processing plane in the case of material processing and at which a workpiece is arranged. Generally, a (plane-parallel) protective glass is arranged between the lens elements of the f-theta lens and the focus plane or the workpiece.

The f-theta lens of the optical arrangement has at least two lens elements, the f-theta lens can in particular have three, four or more lens elements. Owing to the use of high laser powers of for example more than 1 kW, the material of the lens elements used is typically quartz glass, for example synthetic quartz glass, which usually has a refractive index of $n=1.46$ at the laser wavelengths used in this case.

In one embodiment, the f-theta lens has exactly three lens elements arranged one behind the other in the beam path, specifically: a first lens element having a negative refractive power and a first focal length $f_1$, which is preferably in the form of a biconcave lens, a second lens element having a positive refractive power and a second focal length $f_2$, which is preferably in the form of a plano-convex lens or a concave-convex lens, and a third lens element having a positive refractive power and a third focal length $f_3$, which is preferably in the form of a plano-convex lens or a biconvex lens. Such a design of the f-theta lens having three lens elements has proven particularly advantageous for the arrangement of the f-theta lens in the divergent beam path.

In a development of this embodiment, the ratio of the first to third focal lengths $f_1$, $f_2$, $f_3$ to a total focal length f of the f-theta lens meets the following conditions:

$$-0.8 < f_1/f < -0.2,$$

$$0.4 < f_2/f < 1.2,$$

$$0.4 < f_3/f < 1.2.$$

As is generally customary, the focal lengths $f_1$ to $f_3$ of the three lens elements denote the distance of a respective focal point from a main plane of the respective lens element. Accordingly, the total focal length denotes the distance of the focal plane from a replacement main plane of the f-theta lens. The total focal length is the result of the arrangement or the thicknesses of the three lens elements in connection with their air distances. The three lens elements are embodied such that they form, with respect to their focal lengths, a "negative-positive-positive" lens element sequence. It has been shown that, with the above-stated focal length ratios, the requirement in relation to the ratio $\Delta f/f^2$ can be readily met over a large region of the total focal length of between approx. 150 mm or 160 mm and approx. 600 mm.

In one embodiment, the total focal length f of the f-theta lens is more than 345 mm, and all the lens element surfaces have a spherical form. The inventors have found that, with relatively large focal lengths, no aspheric lens element surfaces are required to produce the desired imaging properties of the f-theta lens, i.e., imaging that is as diffraction-limited as possible with a comparatively large scan field.

In an alternative embodiment, the total focal length f of the f-theta lens is 345 mm or less (usually at least 160 mm), and the third lens element has at least one aspheric lens element surface. Owing to the aspheric lens element surface, the total focal length of the f-theta lens can be reduced compared to conventional f-theta lenses having three lens elements by virtue of the fact that the aspheric lens element surface is provided with a typically comparatively small spherical curvature and aberrations of the f-theta lens are corrected by aspherization, i.e., by a suitable deviation from the spherical curvature of the lens element surface.

In a development of this embodiment, the third lens element is embodied in the form of a biconvex lens, and the aspheric lens element surface is formed on a side of the third lens element facing the second lens element. As was described further above, owing to the use of a biconvex lens having an aspheric lens element surface, the focal length of the f-theta lens can be reduced without the aberrations increasing too much.

In an alternative embodiment, the f-theta lens has exactly two lens elements arranged one behind the other in the beam path, specifically: a first lens element, which is in the form of a meniscus lens, and a second lens element, which is in the form of a biconvex lens, a plano-convex lens or a meniscus lens, wherein at least one lens element has one or two aspheric lens element surfaces. The lens element having one or two aspheric lens element surfaces can in particular be the second one of the two lens elements, but it is also possible that both lens elements have aspheric lens element surfaces. In an f-theta lens having two lens elements, it has proven expedient if, in the beam path upstream of the f-theta lens, a wavefront correction optical unit is arranged, as is described for example in EP 1 934 644 B1, which was cited in the introductory part and is incorporated by reference in its entirety in the content of this application.

In a development, the total focal length of the f-theta lens is at least 160 mm. Both when using an f-theta lens having two lens elements and also an f-theta lens having three lens elements, the total focal length is typically more than 160 mm. Shorter total focal lengths can be produced for example using an f-theta lens having four lens elements, as will be described in more detail further below.

In an alternative embodiment, the f-theta lens has exactly four lens elements arranged one behind the other in the beam path, specifically: a first lens element having a first focal length, which is in the form of a biconcave lens, a second lens element having a second focal length, which is in the form of a meniscus lens, a third lens element having a third focal length, and a fourth lens element having a fourth focal length, which is in the form of a biconvex lens, wherein the third lens preferably has at least one aspheric lens element surface. The f-theta lens having the four lens elements can in particular be embodied as described in DE 10 2016 211 811 A1, which is cited in the introductory part and is incorporated by reference in its entirety in the content of this application.

In a development, the third lens element is embodied in the form of a biconvex lens, and the aspheric lens element surface is formed on a side of the third lens element facing the second lens element. A high imaging quality can also be achieved with a relatively short total focal length by using the aspheric lens element surface. For the event that the f-theta lens having the four lens elements has a relatively large total focal length, it is, however, also possible to dispense with an aspheric lens element surface.

In a development, the total focal length of the f-theta lens is less than 160 mm. As was described further above, ideally diffraction-limited imaging can be achieved in an f-theta lens having four lens elements despite a short total focal length in particular owing to the aspheric lens element surface described further above.

The ratios of the first to fourth focal lengths of the first to fourth lens elements to a total focal length of the f-theta lens preferably meet the following conditions:

$$-1.1 < f_1/f < -0.5,$$

$$2.6 < f_2/f < 3.2,$$

$$1.1 < f_3/f < 1.7,$$

$$1.9 < f_4/f < 2.5.$$

In a further embodiment, an air distance a between the first lens element and the second lens element of the f-theta lens lies between 0 mm and 20 mm. In an f-theta lens having exactly two lens elements, the air distance is typically 0 mm. In an f-theta lens that has (exactly) three, (exactly) four or more lens elements, the air distance between the first and the second lens elements is determined in dependence on the total focal length of the f-theta lens, wherein the distance a increases as the total focal length decreases, i.e., the longest distance of approximately approx. 20 mm corresponds to the shortest total focal length.

In a further embodiment, the optical arrangement, in particular the scanner apparatus, is embodied for operation with a laser beam at a first wavelength in the IR wavelength range, preferably between 900 nm and 1100 nm, and/or for operation with a laser beam at a second wavelength in the visible wavelength range, preferably between 440 nm and 650 nm.

The distance a between the first lens element and the second lens element is additionally also dependent on the wavelength of the laser beam passing through the f-theta lens. The f-theta lens with the parameters described further above is optimized for laser radiation in the IR wavelength range. In this case, diffraction-limited imaging can be implemented in a fundamental mode laser beam up to an entrance pupil of approx. 22 mm. Up to an entrance pupil of 33 mm, twice-diffraction-limited imaging can be implemented.

However, the f-theta lens can also be used for laser radiation in the visible wavelength range, for example between approx. 440 nm and 650 nm. In this case, typically the air distance a between the first lens element and the second lens element is shortened by approx. 10% (at most approx. 2.5 mm) compared to the case in which the laser beam has a wavelength in the IR wavelength range. A desired distance a can be set by the choice of mounts for the first lens element or for the second lens element which are suitably dimensioned in the axial direction. By adapting, more precisely reducing, the air distance between the first lens element and the second lens element, nearly diffraction-limited imaging can also be achieved in a wavelength in the visible wavelength range.

In order to achieve the highest possible antireflection effect, an anti-reflective coating which reduces the reflectivity of the respective lens element surfaces to less than approx. 0.5% at least at the wavelength of the laser beam with which the f-theta lens is operated is typically applied on all lens element surfaces and possibly on a protective glass. Such anti-reflective coatings are known to a person skilled in the art, and their structure is therefore not described here in more detail.

As was described further above, the f-theta lens can be operated at at least a first wavelength in the IR wavelength range, preferably between 900 nm and 1100 nm, and at at least a second wavelength in the visible wavelength range, preferably between 440 nm and 650 nm. In this case, too, it has proven expedient if the lens elements have a respective anti-reflective coating that is embodied to suppress reflections in a single wavelength range or for a single wavelength corresponding to the wavelength of the laser beam with which the optical arrangement is operated. Such an anti-reflective coating typically has a greater reflection-suppressing effect for the laser wavelength than an anti-reflective coating that is embodied to suppress reflections in different wavelength ranges. This is expedient in particular for the case that the laser beam has a particularly high laser power. During the production of an f-theta lens optimized for a respective wavelength, the same lens element blanks on which an anti-reflective coating that is optimized for the respective wavelength is applied can be used.

Alternatively, it is possible that the lens elements have an anti-reflective coating that is embodied both for suppressing reflections at at least a first wavelength in the IR wavelength range, preferably between 900 nm and 1100 nm, and also for suppressing reflections at at least a second wavelength in the visible wavelength range, preferably between 440 nm and 650 nm.

In general terms, the small curvature of the lens elements of the f-theta lens having three lens elements or having four lens elements means that there are no restrictions with respect to the antireflection. The given large margin thicknesses of the lens elements additionally allow secure mounting.

Owing to the large scan field, the f-theta lens is typically in the form of an image-side non-telecentric objective lens, i.e., the telecentricity error (maximum angle between chief ray and optical axis) is typically less than 14°.

The optical arrangement described further above, or the scanner apparatus, is able to be used universally for a large number of applications. The optical arrangement can be operated for example both with a laser beam that is generated by a fundamental mode laser source and also with a laser beam that is generated by a multimode laser source. As was described further above, the use of different wavelengths is also possible.

Further advantages of the invention will become apparent from the description and the drawing. Likewise, the features mentioned above and those that will be explained further can be used in each case by themselves or as a plurality in any desired combinations. The embodiments shown and described should not be understood as an exhaustive enumeration, but rather are of illustrative character for outlining the invention.

In the following description of the drawings, identical reference signs are used for identical or functionally identical components.

FIGS. 1a,b highly schematically illustrate an optical arrangement 1 having a collimation device in the form of an individual collimation lens 2 and an f-theta lens 3. The f-theta lens 3 is schematically illustrated in FIGS. 1a,b in the form of a single lens element, but in reality has at least two lens elements, as will be described in more detail further below.

In the example of the optical arrangement 1 shown in FIG. 1a, the f-theta lens 3 is arranged in the collimated beam path 4' of a laser beam 5 that is produced by the collimation lens 2. The f-theta lens 3 focuses the laser beam 5 in a focal plane BE, which is arranged at the distance of the total focal length f of the f-theta lens 3 from the f-theta lens 3. A substantially point-shaped beam exit surface 6, from which the laser beam 5 emerges divergently, is arranged at the distance of the focal length $f_K$ of the collimation lens 2 from the collimation lens 2 and produces the collimated beam path 4' of the laser beam 5.

In the optical arrangement 1 shown in FIG. 1a, in which the f-theta lens 3 is arranged in the collimated beam path 4', the problem arises that in particular in the case of a fundamental mode laser beam 5 having a beam quality factor $M^2 < 10$, i.e., in the case of a laser beam generated by a fundamental mode laser source, comparatively great aberrations occur primarily in the peripheral region of the scan field, with the result that the optical arrangement 1 is able to be used only to a limited extent or with a greater number of lens elements.

In the optical arrangement 1 shown in FIG. 1b, the f-theta lens 3 is arranged in the divergent beam path 4 of the optical arrangement 1. Owing to the arrangement of the f-theta lens 3 in the divergent beam path 4, the laser beam 5 is focused not in the focal plane BE, but in a focus plane FE, which is arranged at a distance $\Delta f$ from the focal plane BE. The focus plane FE is arranged further away from the f-theta lens 3 by the distance $\Delta f$ than the focal plane BE.

In the optical arrangement 1 shown in FIG. 1b, an optical device 7 comprising the beam exit surface 6 and the collimator lens 2 is used for producing the divergent beam path 4. In the example shown in FIG. 1b, the beam exit surface 6 is arranged at a distance $f_K - \Delta f_K$ from the collimation lens 2 that is smaller by an absolute value $\Delta f_K$ than the focal length $f_K$ of the collimation lens 2. Accordingly, the laser beam 5 emerging from the beam exit surface 6 is not fully collimated at the collimation lens 2, but the divergent beam path 4 is produced, in which the f-theta lens 3 is arranged. It is to be understood that the optical device 7, illustrated in FIG. 1b, for producing a divergent beam path 4 of the laser beam 5 can be realized in a large number of ways and is in no way limited to the example illustrated in FIG. 1b. The beam exit surface 6 can be the front face of an optical fiber or can be another surface from which the laser beam 5 emerges divergently. Depending on the type of optical arrangement 1, the optical device 7 may consist only of the beam exit surface 6 from which the laser beam 5 emerges divergently.

For the event that the f-theta lens 3 is used in a scanner apparatus 1, a comparatively short interval for the ratio of the distance $\Delta f$ to the total focal length f of the f-theta lens 3 has proven to be particularly expedient to realize the highest possible imaging quality, ideally imaging that is as diffraction-limited as possible, with the greatest possible scan field (or with the greatest possible scan angles $\theta$).

As can be seen in FIG. 2, the optimum values for the ratio $\Delta f/f$ in dependence on the total focal length f (approximately) lie on a straight line, i.e., the quotient $\Delta f/f^2$ is approximately constant over a comparatively large value range of the total focal length f between approx. 150 mm and approx. 500 mm. An optimum imaging quality of the f-theta lens 3 is achieved if, for the quotient $\Delta f/f^2$: $0.00018/\text{mm} < \Delta f/f^2 < 0.0003/\text{mm}$.

The optical arrangement 1 in FIG. 1b can be a scanner apparatus 1 for material processing, for example for laser welding or laser cutting. Such a scanner apparatus 1 will be described below with reference to FIG. 3. The scanner apparatus 1 has an optical fiber 8, which has a front face that serves as a beam exit surface 6 and from which the laser beam 5 emerges divergently and with a high radiant power (>1 kW). As was described further above in connection with FIG. 1b, the distance $f_K - \Delta f_K$ between the beam exit surface 6 and the collimation lens 2 is shorter than the focal length $f_K$ of the collimator lens 2, with the result that the laser beam 5 is not fully collimated by the collimation lens 2 and has a divergent beam path 4 even after the collimation lens 2.

The laser beam 5 is deflected by 90° at a deflection mirror 9 and enters a scanner head 10 via an entrance aperture. In the scanner head 10, the laser beam 5 is first incident on a planar X-scanner mirror 11, which deflects the beam in the X-direction onto a planar Y-scanner mirror 12, which further deflects the laser beam 5 into the Y-direction. The X-scanner mirror 11 and the Y-scanner mirror 12 are attached to galvanometers, i.e., the latter can be rotated or tilted. The position of the axis of rotation of the galvanometers determines the deflection angle of the respective scanner mirror 11, 12 and thereby the position of the laser beam 5 in the image field, or in the focus plane FE. The laser beam 5 leaves the scanner head 10 through an exit opening to which the f-theta lens 3 is attached which focuses the laser beam 5 onto the focus plane FE in which a workpiece to be processed is arranged during the operation of the scanner apparatus 1. A plate-shaped protective glass SG protects the f-theta lens 3 against contamination. Rather than two scanner mirrors 11, 12, the scanner apparatus 1 can have a single scanner mirror, which is tiltable about two axes of rotation.

As in FIG. 1b, the focus plane FE is also arranged at a distance $\Delta f$ from the focal plane BE of the f-theta lens 3 in FIG. 3, wherein the condition for $\Delta f/f^2$ stated above is met.

The f-theta lens 3 which is illustrated in FIG. 1b and in FIG. 3 and is arranged in the divergent beam path 4 of the laser beam 5 can be embodied in different ways. The f-theta lens 3 can have in particular two, three or four lens elements L1, L2, L3, L4. In the figures described below, the f-theta lens 3 is illustrated in each case in the collimated beam path to simplify the illustration.

FIGS. 4a,b illustrate an example of an f-theta lens 3, which has exactly three lens elements L1, L2, L3: The first lens element L1 is a biconcave lens having a negative refractive power, i.e., having a first focal length $f_1$, for which: $f_1<0$. The second lens element L2 has a second focal length $f_2$ and a positive refractive power ($f_2>0$). The third lens element L3 has a third focal length $f_3$ and a positive refractive power ($f_3>0$). In the example illustrated in FIGS. 4a,b, the second lens element L2 is a plano-convex lens, but the second lens element L2 can also be a concave-convex lens. In the example shown in FIGS. 4a,b, the third lens element L3 is a biconvex lens, but the third lens element L3 can also be a plano-convex lens, in which the lens element surface that is at the front in the beam path is formed to be planar.

For the ratio of the first to third focal lengths $f_1$, $f_2$, $f_3$ of the three lens elements L1, L2, L3 to the total focal length f of the f-theta lens 3, in the example shown in FIGS. 4a,b:

$$-0.8<f_1/f<-0.2,$$

$$0.4<f_2/f<1.2,$$

$$0.4<f_3/f<1.2.$$

The conditions for the three focal lengths $f_1$, $f_2$, $f_3$ stated further above have proven to be particularly advantageous if the f-theta lens 3 is arranged in the divergent beam path 4.

The f-theta lens 3 shown in FIG. 4a has a total focal length f of 265 mm. At this total focal length f, or generally at focal lengths f of between approx. 160 mm and approx. 345 mm, the lens element surface 13 of the third lens element L3 that faces the second lens element L2 and is first in the beam path is an aspheric lens element surface 13. The aspheric lens element surface 13 serves for reducing aberrations at comparatively short total focal lengths f of the f-theta lens 3 of 345 mm or less.

The f-theta lens 3 shown in FIG. 4b, by contrast, has a greater total focal length f of 450 mm and does not require an aspheric lens element surface 13. Accordingly, all lens element surfaces of the three lens elements L1, L2, L3 in the f-theta lens 3 of FIG. 4b have a spherical form. The design having three spherical lens elements L1, L2, L3 shown in FIG. 4b can be used over a comparatively large value range of the total focal length f up to approx. 600 mm or more.

FIGS. 5a,b show spot matrix diagrams of the imaging produced by means of the f-theta lens 3 shown in FIGS. 4a,b. The diagrams each show the Airy disk as a dashed circle. In the example shown in FIG. 5a, the Airy radius is approx. 22.85 μm, and in the example shown in FIG. 5b it is approx. 7.4 μm. The ten spot matrix diagrams illustrated in a respective row correspond to different angle settings of the two scanner mirrors 11, 12, wherein the spot matrix diagram illustrated on the far left corresponds to a normal incidence on the focus plane FE (both scan angles $\theta_x$ and $\theta_Y$=0), while in the other spot diagrams the respective first and/or second scanner mirror 11, 12 is deflected by a respective scan angle $\theta_x$ and $\theta_Y$ of up to 9°.

The f-theta lens 3 having the above-stated parameters is optimized for a wavelength $\lambda_1$ (see FIG. 3) of the laser beam 5, which lies in the IR wavelength range between 900 nm and 1100 nm, e.g., is 1075 nm. For this wavelength range and a maximum entrance pupil of 22 mm (diameter of the laser beam 5 in the entrance pupil plane), the f-theta lens 3 produces 1/e diffraction-limited imaging, as is evident from the spot diagrams shown in FIG. 5a, in which no spots lie outside the Airy disk.

The f-theta lens 3 having the above-stated parameters or suitably modified parameters can also be used with a laser beam 5 having a second wavelength $\lambda_2$, which lies in the visible wavelength range, more specifically in the range between 440 nm and 650 nm, e.g., is 515 nm. In this case and also for a wavelength $\lambda_1$ in the IR wavelength range, the diameter of the laser beam 5 in the entrance pupil plane can be enlarged to approx. 33 mm, and still twice-diffraction-limited imaging can be realized, as is illustrated for this case in FIG. 5b.

In the examples described here, the air distance a, illustrated in FIGS. 4a,b, between the first lens element L1 and the second lens element L2 is in each case between 0 mm and 20 mm, wherein the greatest air distance a is used at the smallest total focal length f described here (here: 160 mm). With a given total focal length f of the f-theta lens 3, the air distance a between the first lens element L1 and the second lens element L2 is dependent on the wavelength $\lambda_1$, $\lambda_2$ of the laser beam 5: For the event that the wavelength $\lambda_2$ of the laser beam 5 lies in the visible wavelength range between approx. 440 nm and approx. 650 nm, the air distance a is selected to be approx. 5% or possibly approx. 10% shorter (generally no more than approx. 2.5 mm shorter) than for the case that the wavelength $\lambda_1$ of the laser beam 5 lies in the IR wavelength range between 900 nm and 1100 nm. The spot diagram illustrated in FIG. 5b was calculated with a reduced air distance a between the first lens element L1 and the second lens element L2.

In order to achieve sufficient antireflection of the lens elements L1 to L3 and of the protective glass SG, in each case an anti-reflective coating is applied on the lens element surfaces of the three lens elements L1 to L3 and on the two sides of the plane-parallel protective glass SG. The anti-reflective coating is of a narrowband type, i.e., it is embodied for suppressing reflections either at the first wavelength $\lambda_1$ or at the second wavelength $\lambda_2$. This makes sense in particular if the laser beam 5 has a particularly high power.

The anti-reflective coating is typically a multilayer coating having a plurality of layers with a high and low refractive index in alternation in order to generate destructive interference for the respective wavelengths $\lambda_1$, $\lambda_2$. For example, the anti-reflective coating applied on the quartz glass material can have, for the first or for the second wavelength $\lambda_1$, $\lambda_2$, a reflectivity of less than 0.5%. The scanning apparatus 1 in this case is operated only with exactly one laser source (not depicted), in particular with a fundamental mode laser source, which generates a laser beam 5 having the respective wavelength $\lambda_1$ or $\lambda_2$.

As an alternative to the use of a narrowband anti-reflective coating, an anti-reflective coating that is optimized both for the suppression of reflections at the first wavelength $\lambda_1$ and also for the suppression of reflections at the second wavelength $\lambda_2$ can be applied on the lens element surfaces of the three lens elements L1 to L3 and on the protective glass SG.

Figure 6A:
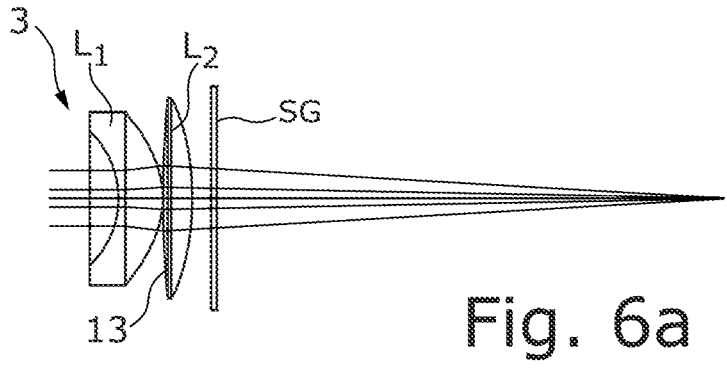
FIGS. 6a, 6b, and 6c show schematic illustrations of an f-theta lens having two lens elements, according to embodiments.
Figure 6B:
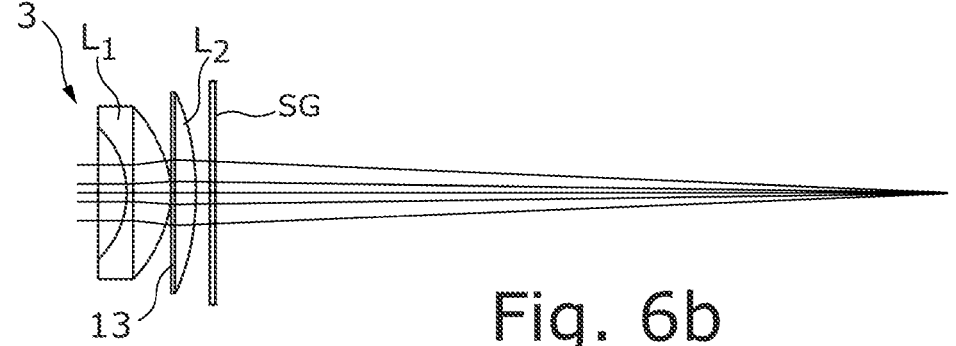
Figure 6C:
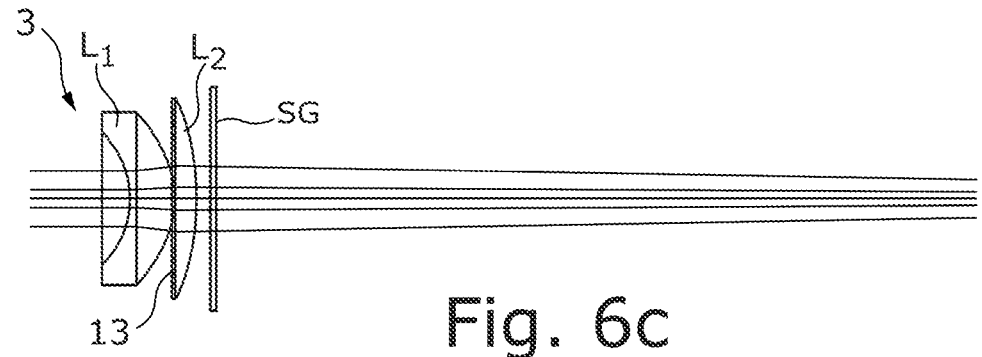

As an alternative to the f-theta lens 3 shown in FIGS. 5*a,b* having three lens elements L1, L2, L3, it is also possible to arrange an f-theta lens 3 having two lens elements L1, L2 in the divergent beam path 4, as is illustrated by way of example in FIGS. 6*a-c*. In all three f-theta lenses 3 illustrated in FIGS. 6*a-c*, the first lens element L1 is in the form of a meniscus lens having an approximately spherical curvature. The second lens element L2 in the example shown in FIG. 6*a*, in which the f-theta lens 3 has a total focal length f of 265 mm, is a biconvex lens. In the example shown in FIG. 6*b*, in which the f-theta lens 3 has a total focal length f of 345 mm, the second lens element L2 is a plano-convex lens. In the f-theta lens 3 shown in FIG. 6*c*, which has a total focal length f of more than approx. 450 mm, the second lens element L2 is likewise a meniscus lens. All three f-theta lenses 3 have in common that the second lens element L2 has an aspheric lens element surface 13 on its side facing the first lens element L1. The distance between the first lens element L1 and the second lens element L2 of the f-theta lens 3 illustrated in FIGS. 6*a-c* is 0 mm, i.e., the two lens elements L1, L2 practically immediately adjoin one another. Adaptation of the air distance a to the respective wavelengths $\lambda_1$, $\lambda_2$ of the laser beam 5 is therefore not possible in the examples shown in FIGS. 6*a-c*.

Figure 7:
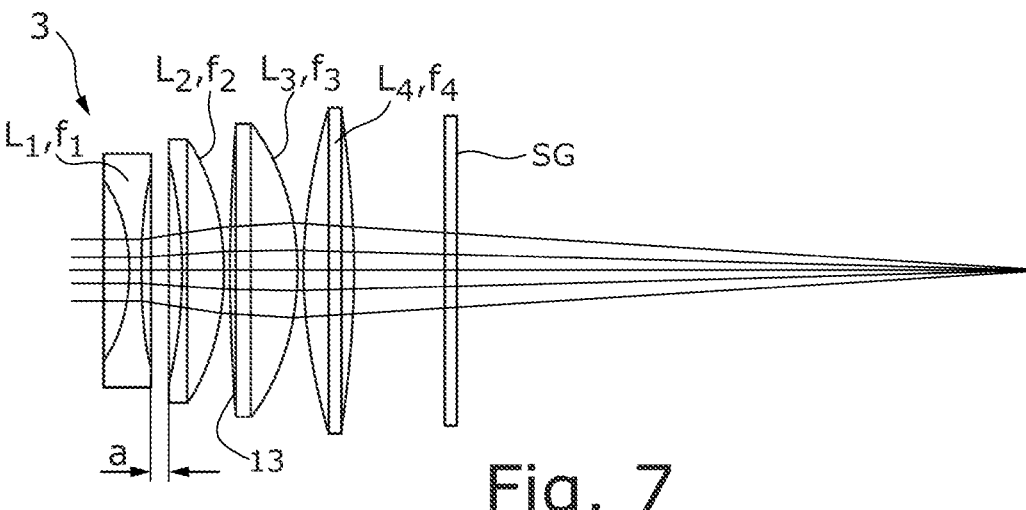
FIG. 7 shows a schematic illustration of an f-theta lens having four lens elements, according to embodiments.

However, such an adaptation can be performed in the f-theta lens 3 shown in FIG. 7, which has four lens elements L1 to L4. While in the examples described further above the total focal length f of the f-theta lens 3 was at least approx. 160 mm, in the f-theta lens 3 shown in FIG. 7 smaller total focal lengths f of less than approx. 160 mm can be achieved.

The f-theta lens 3 shown in FIG. 7 has four successive lens elements L1, L2, L3, L4 along the beam path of the laser beam 5. The first lens element L1 has a negative focal length, while the second to fourth lens elements L2, L3, L4 have a positive focal length. The first lens element L1 of the f-theta lens 3 is a biconcave lens, the second lens element L2 is a meniscus lens, the third lens element L3 and the fourth lens element L4 are a biconvex lens in each case. In principle, the f-theta lens 3 can have only spherical lens element surfaces, but in the example shown an aspheric lens element surface 13 is formed on the side of the third lens element L3 facing the second lens element L2.

In the example shown in FIG. 7, the ratios of the focal lengths $f_1$ to $f_4$ of the four lens elements L1 to L4 with respect to a total focal length f of the f-theta lens 3 satisfy the following four conditions:

$$-1.1 < f_1/f < -0.5,$$

$$2.6 < f_2/f < 3.2,$$

$$1.1 < f_3/f < 1.7,$$

$$1.9 < f_4/f < 2.5.$$

The total focal length f of the f-theta lens 3 shown in FIG. 7 is typically between 80 mm and 120 mm. This results in an image-side back focal length of between approx. 120 mm and approx. 160 mm from the image-side vertex of the fourth lens element L4. For further details of the f-theta lens 3 illustrated in FIG. 7, reference is made to DE 10 2016 211 811 A1.

In all examples described further above, the material of the lens elements L1 to L4 and the material of the protective glass SG is (synthetic) quartz glass, which is resistant to laser radiation at powers of more than 1 kW.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical arrangement comprising:
   a laser source for producing a laser beam;
   a first lens positioned at a first distance in front of the laser source such that the laser beam is incident on the first lens and emerges from the first lens as a diverging laser beam along a divergent beam path downstream of the first lens; and
   an f-theta lens disposed in the divergent beam path of the laser beam downstream of the first lens in order to focus the laser beam into a focus plane, wherein the focus plane is located at a finite distance $\Delta f$ from a focal plane of the f-theta lens.

2. The optical arrangement as claimed in claim 1, wherein the finite distance $\Delta f$ of the focus plane from the focal plane satisfies:

$$0.00018/\text{mm} < \Delta f/f^2 < 0.0003/\text{mm},$$

wherein f denotes a total focal length of the f-theta lens.

3. The optical arrangement as claimed in claim 1, wherein the laser source comprises a beam exit surface for divergent emergence of the laser beam from the laser source, wherein the beam exit surface is disposed at the first distance from the first lens that is shorter than a focal length of the first lens, so that the laser beam emerging from the first lens is diverging along the divergent beam path downstream of the first lens.

4. The optical arrangement as claimed in claim 1, furthermore comprising:

at least one scanner mirror for deflecting the laser beam, wherein the scanner mirror is disposed between the first lens and the f-theta lens.

5. The optical arrangement as claimed in claim 1, wherein the f-theta lens includes a first lens element, a second lens element, and a third lens element arranged one behind the other in the divergent beam path, and wherein:

the first lens element has a negative refractive power and a first focal length $f_1$, the second lens element has a positive refractive power and a second focal length $f_2$, the third lens element has a positive refractive power and a third focal length $f_3$.

6. The optical arrangement as claimed in claim 5, wherein the first lens element is a biconcave lens, the second lens element is a plano-convex lens or a concave-convex lens, and the third lens element is a plano-convex lens or a biconvex lens.

7. The optical arrangement as claimed in claim 5, wherein a ratio of the first focal length $f_1$ to a total focal length f of the f-theta lens, a ratio of the second focal length $f_2$ to the total focal length f, and a ratio of the third focal length $f_3$ to the total focal length f meet the following conditions:

$$-0.8 < f_1/f < -0.2,$$

$$0.4 < f_2/f < 1.2,$$

$$0.4 < f_3/f < 1.2.$$

8. The optical arrangement as claimed in claim 5, wherein the total focal length f of the f-theta lens is more than 345 mm, and all surfaces of the first lens element, of the second lens element, and of the third lens element have a spherical form.

9. The optical arrangement as claimed in claim 5, wherein the total focal length f of the f-theta lens is 345 mm or less, and wherein the third lens element has at least one aspheric surface.

10. The optical arrangement as claimed in claim 9, wherein the third lens element is a biconvex lens, and the at least one aspheric surface is formed on a side of the third lens element facing the second lens element.

11. The optical arrangement as claimed in claim 5, wherein an air distance between the first lens element and the second lens element of the f-theta lens lies between 0 mm and 20 mm.

12. The optical arrangement as claimed in claim 1, wherein the f-theta lens includes a first lens element and a second lens element arranged one behind the other in the divergent beam path, wherein:

the first lens element is a meniscus lens, and the second lens element is a biconvex lens, or a plano-convex lens, or a meniscus lens, wherein at least one of the first lens element and the second lens element has one or two aspheric surfaces.

13. The optical arrangement as claimed in claim 1, wherein a focal length of the f-theta lens is at least 160 mm.

14. The optical arrangement as claimed in claim 1, wherein the f-theta lens includes a first lens element, a second lens element, a third lens element, and a fourth lens element arranged one behind the other in the divergent beam path, wherein:

the first lens element has a first focal length, and is a biconcave lens, the second lens element has a second focal length, and is a meniscus lens, the third lens element has a third focal length, and the fourth lens element has a fourth focal length, and is a biconvex lens, wherein the third lens element has at least one aspheric surface.

15. The optical arrangement as claimed in claim 14, wherein the third lens element is a biconvex lens, and the aspheric surface is formed on a side of the third lens element facing the second lens element.

16. The optical arrangement as claimed in claim 14, wherein a total focal length of the f-theta lens is less than 160 mm.

17. The optical arrangement as claimed in claim 1 is configured for operation with the laser beam at a first wavelength in an IR wavelength range, and/or for operation with the laser beam at a second wavelength in a visible wavelength range.

18. The optical arrangement as claimed in claim 17, wherein the IR wavelength range is between 900 nm and 1100 nm.

19. The optical arrangement as claimed in claim 17, wherein the visible wavelength range is between 440 nm and 650 nm.

* * * * *